US012802836B2

(12) United States Patent
Tian et al.

(10) Patent No.: US 12,802,836 B2
(45) Date of Patent: Nov. 17, 2026

(54) SYSTEM AND METHOD FOR PARALLEL ASSEMBLY OF ARBITRARY PARTICLE ARRAYS WITH MULTIPLE TWEEZERS

(71) Applicant: NATIONAL UNIVERSITY OF SINGAPORE, Singapore (SG)

(72) Inventors: Weikun Tian, Singapore (SG); Wen Jun Wee, Singapore (SG); An Qu, Singapore (SG); Jun Ming Lim, Singapore (SG); Prithvi Raj Datla, Singapore (SG); Vanessa Pei Wen Koh, Singapore (SG); Huanqian Loh, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 584 days.

(21) Appl. No.: 18/196,476

(22) Filed: May 12, 2023

(65) Prior Publication Data

US 2024/0377701 A1 Nov. 14, 2024

(51) Int. Cl.

| | |
|---|---|
| ***G21K 1/30*** | (2026.01) |
| ***G02B 21/32*** | (2006.01) |
| ***G02F 1/33*** | (2006.01) |
| *G03H 1/00* | (2006.01) |

(52) U.S. Cl.

CPC ............... *G21K 1/30* (2026.01); *G02B 21/32* (2013.01); *G02F 1/33* (2013.01); *G03H 2001/0077* (2013.01)

(58) Field of Classification Search
None
See application file for complete search history.

(56) References Cited

U.S. PATENT DOCUMENTS

2023/0411035 A1* 12/2023 Schymik .................. G06N 5/01

OTHER PUBLICATIONS

S. Ebadi, T. T. Wang, H. Levine, A. Keesling, G. Semeghini, A. Omran, D. Bluvstein, R. Samajdar, H. Pichler, W. W. Ho, S. Choi, S. Sachdev, M. Greiner, V. Vuleti'c, and M. D. Lukin, Quantum phases of matter on a 256-atom programmable quantum simulator, Nature 595, 227 (2021).

A. Browaeys and T. Lahaye, Many-body physics with individually controlled Rydberg atoms, Nat. Phys. 16, 132 (2020).

(Continued)

*Primary Examiner* — Eliza W Osenbaugh-Stewart
(74) *Attorney, Agent, or Firm* — Volpe Koenig

(57) ABSTRACT

An optical tweezer arrays system and a method of arranging a particle array. In one embodiment, the optical tweezer arrays system comprises first and second optical paths from respective light sources to a substrate; and a sensor for imaging the particle array; wherein the first optical path comprises a first pair of acousto-optic deflectors configured for deflecting a first light beam for generating static optical tweezers for the particle array on the substrate; and wherein the second optical path comprises a second pair of acousto-optic deflectors configured for deflecting a second light beam for generating multiple mobile optical tweezers simultaneously for re-arranging particles in the particle array on the substrate.

20 Claims, 7 Drawing Sheets

(56) References Cited

OTHER PUBLICATIONS

P. Scholl, M. Schuler, H. J. Williams, A. A. Eberharter, D. Barredo, K.-N. Schymik, V. Lienhard, L.-P. Henry, T. C. Lang, T. Lahaye, A. M. Lauchli, and A. Browaeys, Quantum simulation of 2D antiferromagnets with hundreds of Rydberg atoms, Nature 595, 233 (2021).
G. Semeghini, H. Levine, A. Keesling, S. Ebadi, T. T. Wang, D. Bluvstein, R. Verresen, H. Pichler, M. Kalinowski, R. Samajdar, A. Omran, S. Sachdev, A. Vishwanath, M. Greiner, V. Vuleti'c, and M. D. Lukin, Probing topological spin liquids on a programmable quantum simulator, Science 374, 1242 (2021).
P. Scholl, H. J.Williams, G. Bornet, F.Wallner, D. Barredo, L. Henriet, A. Signoles, C. Hainaut, T. Franz, S. Geier, A. Tebben, A. Salzinger, G. Zurn, T. Lahaye, M. Weidemüller, and A. Browaeys, Microwave Engineering of Programmable XXZ Hamiltonians in Arrays of Rydberg Atoms, PRX Quantum 3, 020303 (2022).
B.M. Spar, E. Guardado-Sanchez, S. Chi, Z. Z. Yan, and W. S. Bakr, Realization of a Fermi-Hubbard Optical Tweezer Array, Phys. Rev. Lett. 128, 223202 (2022).
N. Lorenz, L. Festa, L.-M. Steinert, and C. Gross, Raman sideband cooling in optical tweezer arrays for Rydberg dressing, SciPost Phys. 10, 052 (2021).
Y. Wang, S. Shevate, T. M. Wintermantel, M. Morgado, G. Lochead, and S. Whitlock, Preparation of hundreds of microscopic atomic ensembles in optical tweezer arrays, NPJ Quantum Inf. 6, 54 (2020).
M. Morgado and S. Whitlock, Quantum simulation and computing with Rydberg-interacting qubits, AVS Quantum Sci. 3, 023501 (2021).
X. Wu, X. Liang, Y. Tian, F. Yang, C. Chen, Y.-C. Liu, M. K. Tey, and L. You, A concise review of Rydberg atom based quantum computation and quantum simulation, Chin. Phys. B 30, 020305 (2021).
A. M. Kaufman and K.-K. Ni, Quantum science with optical tweezer arrays of ultracold atoms and molecules, Nat. Phys. 17, 1324 (2021).
Y.-Y. Jau, A. M. Hankin, T. Keating, I. H. Deutsch, and G. W. Biedermann, Entangling atomic spins with a Rydberg- dressed spin-flip blockade, Nat. Phys. 12, 71 (2016).
C. J. Picken, R. Legaie, K. McDonnell, and J. D. Pritchard, Entanglement of neutral-atom qubits with long ground- Rydberg coherence times, Quantum Sci. Technol. 4, 015011 (2018).
M. Kim, K. Kim, J. Hwang, E.-G. Moon, and J. Ahn, Rydberg quantum wires for maximum independent set problems, Nat. Phys. 18, 755 (2022).
D. Bluvstein, H. Levine, G. Semeghini, T. T. Wang, S. Ebadi, M. Kalinowski, A. Keesling, N. Maskara, H. Pichler, M. Greiner, V. Vuleti'c, and M. D. Lukin, A quantum processor based on coherent transport of entangled atom arrays, Nature 604, 451 (2022).
T. M. Graham et al., Multi-qubit entanglement and algorithms on a neutral-atom quantum computer, Nature 604, 457 (2022).
I. S. Madjarov, A. Cooper, A. L. Shaw, J. P. Covey, V. Schkolnik, T. H. Yoon, J. R. Williams, and M. Endres, An Atomic-Array Optical Clock with Single-Atom Readout, Phys. Rev. X 9, 041052 (2019).
A. W. Young, W. J. Eckner, W. R. Milner, D. Kedar, M. A. Norcia, E. Oelker, N. Schine, J. Ye, and A. M. Kaufman, Half-minute-scale atomic coherence and high relative stability in a tweezer clock, Nature 588, 408 (2020).
J. Choi, A. L. Shaw, I. S. Madjarov, X. Xie, R. Finkelstein, J. P. Covey, J. S. Cotler, D. K. Mark, H.-Y. Huang, A. Kale, H. Pichler, F. G. S. L. Brandão, S. Choi, and M. Endres, Preparing random states and benchmarking with many-body quantum chaos, Nature 613, 468 (2023).
A. Jenkins, J. W. Lis, A. Senoo, W. F. McGrew, and A. M. Kaufman, Ytterbium Nuclear-Spin Qubits in an Optical Tweezer Array, Phys. Rev. X 12, 021027 (2022).
D. Okuno, Y. Nakamura, T. Kusano, Y. Takasu, N. Takei, H. Konishi, and Y. Takahashi, High-resolution spectroscopy and single-photon Rydberg excitation of reconfigurable ytterbium atom tweezer arrays utilizing a metastable state, J. Phys. Soc. Japan 91, 084301 (2022).
S. Ma, A. P. Burgers, G. Liu, J. Wilson, B. Zhang, and J. D. Thompson, Universal Gate Operations on Nuclear Spin Qubits in an Optical Tweezer Array of 171Yb Atoms, Phys. Rev. X 12, 021028 (2022).
R. V. Brooks, S. Spence, A. Guttridge, A. Alampounti, A. Rakonjac, L. A. McArd, J. M. Hutson, and S. L. Cornish, Preparation of one 87Rb and one 133Cs atom in a single optical tweezer, New J. Phys. 23, 065002 (2021).
K. Singh, S. Anand, A. Pocklington, J. T. Kemp, and H. Bernien, Dual-Element, Two-Dimensional Atom Array with Continuous-Mode Operation, Phys. Rev. X 12, 011040 (2022).
C. Sheng, J. Hou, X. He, K. Wang, R. Guo, J. Zhuang, B. Mamat, P. Xu, M. Liu, J. Wang, and M. Zhan, Defect-Free Arbitrary-Geometry Assembly of Mixed-Species Atom Arrays, Phys. Rev. Lett. 128, 083202 (2022).
L. R. Liu, J. D. Hood, Y. Yu, J. T. Zhang, N. R. Hutzler, T. Rosenband, and K.-K. Ni, Building one molecule from a reservoir of two atoms, Science 360, 900 (2018).
L. Anderegg, L. W. Cheuk, Y. Bao, S. Burchesky, W. Ketterle, K.-K. Ni, and J. M. Doyle, An optical tweezer array of ultracold molecules, Science 365, 1156 (2019).
X. He, K. Wang, J. Zhuang, P. Xu, X. Gao, R. Guo, C. Sheng, M. Liu, J. Wang, J. Li, G. V. Shlyapnikov, and M. Zhan, Coherently forming a single molecule in an optical trap, Science 370, 331 (2020).
C. M. Holland, Y. Lu, and L. W. Cheuk, Bichromatic imaging of single molecules in an optical tweezer array, arXiv:2208.12159 (2022).
D. S. Weiss, J. Vala, A. V. Thapliyal, S. Myrgren, U. Vazirani, and K. B. Whaley, Another way to approach zero entropy for a finite system of atoms, Phys. Rev. A 70, 040302(R) (2004).
A. Kumar, T.-Y. Wu, F. Giraldo, and D. S. Weiss, Sorting ultracold atoms in a three-dimensional optical lattice in a realization of Maxwell's demon, Nature 561, 83 (2018).
D. Barredo, S. de Léseleuc, V. Lienhard, T. Lahaye, and A. Browaeys, An atom-by-atom assembler of defect-free arbitrary two-dimensional atomic arrays, Science 354, 1021 (2016).
C. Sheng, J. Hou, X. He, P. Xu, K. Wang, J. Zhuang, X. Li, M. Liu, J. Wang, and M. Zhan, Efficient preparation of two- dimensional defect-free atom arrays with near-fewest sorting-atom moves, Phys. Rev. Res. 3, 023008 (2021).
T. Grünzweig, A. Hilliard, M.McGovern, and M. F. Andersen, Near-deterministic preparation of a single atom in an optical microtrap, Nat. Phys. 6, 951 (2010).
M. O. Brown, T. Thiele, C. Kiehl, T.-W. Hsu, and C. A. Regal, Gray-Molasses Optical-Tweezer Loading: Controlling Collisions for Scaling Atom-Array Assembly, Phys. Rev. X 9, 011057 (2019).
M. M. Aliyu, L. Zhao, X. Q. Quek, K. C. Yellapragada, and H. Loh, D1 magic wavelength tweezers for scaling atom arrays, Phys. Rev. Res. 3, 043059 (2021).
J. Ang'ong'a, C. Huang, J. P. Covey, and B. Gadway, Gray molasses cooling of 39K atoms in optical tweezers, Phys. Rev. Res. 4, 013240 (2022).
K.-N. Schymik, B. Ximenez, E. Bloch, D. Dreon, A. Signoles, F. Nogrette, D. Barredo, A. Browaeys, and T. Lahaye, In situ equalization of single-atom loading in largescale optical tweezer arrays, Phys. Rev. A 106, 022611 (2022).
K.-N. Schymik, S. Pancaldi, F. Nogrette, D. Barredo, J. Paris, A. Browaeys, and T. Lahaye, Single Atoms with 6000- Second Trapping Lifetimes in Optical-Tweezer Arrays at Cryogenic Temperatures, Phys. Rev. Appl. 16, 034013 (2021).
K.-N. Schymik, V. Lienhard, D. Barredo, P. Scholl, H. Williams, A. Browaeys, and T. Lahaye, Enhanced atom-by-atom assembly of arbitrary tweezer arrays, Phys. Rev. A 102, 063107 (2020).
R. Samajdar, W. W. Ho, H. Pichler, M. D. Lukin, and S. Sachdev, Quantum phases of Rydberg atoms on a kagome lattice, Proc. Natl. Acad. Sci. U.S.A. 118, e2015785118 (2021).
R. Verresen, M. D. Lukin, and A. Vishwanath, Prediction of Toric Code Topological Order from Rydberg Blockade, Phys. Rev. X 11, 031005 (2021).

(56) References Cited

OTHER PUBLICATIONS

C.-X. Li, S. Yang, and J.-B. Xu, Quantum phases of Rydberg atoms on a frustrated triangular-lattice array, Opt. Lett. 47, 1093 (2022).
Y. Zhou, K. Kanoda, and T.-K. Ng, Quantum spin liquid states, Rev. Mod. Phys. 89, 025003 (2017).
N. E. Myerson-Jain, S. Yan, D.Weld, and C. Xu, Construction of Fractal Order and Phase Transition with Rydberg Atoms, Phys. Rev. Lett. 128, 017601 (2022).
T. M. Graham, M. Kwon, B. Grinkemeyer, Z. Marra, X. Jiang, M. T. Lichtman, Y. Sun, M. Ebert, and M. Saffman, Rydberg-Mediated Entanglement in a Two-Dimensional Neutral Atom Qubit Array, Phys. Rev. Lett. 123, 230501 (2019).
A. Qu, B. Evrard, J. Dalibard, and F. Gerbier, Probing Spin Correlations in a Bose-Einstein Condensate Near the Single-Atom Level, Phys. Rev. Lett. 125, 033401 (2020).
M. Endres, H. Bernien, A. Keesling, H. Levine, E. R. Anschuetz, A. Krajenbrink, C. Senko, V. Vuletic, M. Greiner, and M. D. Lukin, Atom-by-atom assembly of defect-free one-dimensional cold atom arrays, Science 354, 1024 (2016).
J. T. Zhang, L. R. B. Picard, W. B. Cairncross, K. Wang, Y. Yu, F. Fang, and K.-K. Ni, An optical tweezer array of ground-state polar molecules, Quantum Sci. Technol. 7, 035006 (2022).
D. Ohl de Mello, D. Schaffner, J.Werkmann, T. Preuschoff, L. Kohfahl, M. Schlosser, and G. Birkl, Defect-Free Assembly of 2D Clusters of More Than 100 Single-Atom Quantum Systems, Phys. Rev. Lett. 122, 203601 (2019).
M. E. Gehm, K.M. O'Hara, T. A. Savard, and J. E. Thomas, Dynamics of noise-induced heating in atom traps, Phys. Rev. A 58, 3914 (1998).

* cited by examiner (a)

(b)

(c)

(d)

(e)

SYSTEM AND METHOD FOR PARALLEL ASSEMBLY OF ARBITRARY PARTICLE ARRAYS WITH MULTIPLE TWEEZERS

TECHNICAL FIELD

This invention relates broadly to an optical tweezer arrays system and a method of arranging a particle array, in particular to assembly of arbitrary defect-free atom particle arrays with a multitweezer algorithm and system.

BACKGROUND

Any mention and/or discussion of prior art throughout the specification should not be considered, in any way, as an admission that this prior art is well known or forms part of common general knowledge in the field.

Individual neutral atoms trapped in optical tweezer arrays with programmable geometries and interactions have become a powerful platform for quantum simulation, quantum computation, quantum metrology, and foundational studies of quantum mechanics. Recent work has extended this platform beyond alkali Rydberg atoms to encompass alkaline earths, mixed-species arrays, and molecules, elevating the versatility of the tweezer array platform.

Many of these quantum science applications would benefit from the ability to generate large-scale defect-free atom arrays. In quantum simulation studies of quantum magnetism, for instance, defect-free atom arrays are crucial for obtaining clean measurements of order parameters. A pioneering method for assembling defect-free atom arrays uses a sequence of state-dependent translations on an optical lattice to sort atoms in parallel. For optical tweezer arrays, one can use an auxiliary set of mobile tweezers in conjunction with a static optical tweezer array to rearrange single atoms that are stochastically loaded in a base set of static tweezers. In this case, the filling fraction is typically limited by rearrangement loss from a finite transit time and imperfect transfer of atoms between the mobile and static tweezer sets.

Of the two limitations, the first limitation can be mitigated by embedding the tweezer array setup in a cryogenic vacuum system. Using this method, the atom lifetime can be extended to 6000 s, which is about 2 orders of magnitude higher than that for room-temperature setups. A complementary method is to minimize the rearrangement time by reducing the number of moves required, which can be achieved with efficient atom-sorting algorithms. So far, efforts to search for optimal rearrangement algorithms have focused on single-tweezer movements, where only one atom is sorted at a time. These algorithms include the linear sum assignment problem (LSAP) solver, the compression algorithm, and the heuristic cluster algorithm (HCA). The move complexity of these single-tweezer algorithms, however optimized, scale at best linearly with the target array size. Algorithms that can outperform the linear scaling limit would thus be more efficient for assembling large atom arrays.

Recently, a multitweezer assembly algorithm for defect-free atom arrays has been demonstrated. However, the algorithm has a disadvantage associated with a likelihood of propagating defects through the array, resulting in redundancy in moves, which limits its ability to reach full parallelism.

Embodiments of the present invention seek to address one or more of the above-mentioned needs.

SUMMARY

In accordance with a first aspect of the present invention there is provided an optical tweezer arrays system comprising:

first and second optical paths from respective light sources to a substrate; and a sensor for imaging the particle array;

wherein the first optical path comprises a first pair of acousto-optic deflectors configured for deflecting a first light beam for generating static optical tweezers for the particle array on the substrate; and wherein the second optical path comprises a second pair of acousto-optic deflectors configured for deflecting a second light beam for generating multiple mobile optical tweezers simultaneously for re-arranging particles in the particle array on the substrate.

In accordance with a second aspect of the present invention there is provided a method of arranging a particle array comprising the steps of:

providing first and second optical paths from respective light sources to a substrate; providing a sensor for imaging the particle array;

using a first pair of acousto-optic deflectors comprised in the first optical path for deflecting a first light beam for generating static optical tweezers for the particle array on the substrate; and using a second pair of acousto-optic deflectors comprised in the second optical path for deflecting a second light beam for generating multiple mobile optical tweezers simultaneously for re-arranging particles in the particle array on the substrate.

In accordance with a third aspect of the present invention there is provided a method of arranging a particle array comprising the steps of:

generating static optical tweezers for the particle array such that a target array and a reservoir array are generated on a substrate, wherein the reservoir array surrounds the target array;

generating multiple mobile optical tweezers simultaneously based on an image of the particle array on the substrate representative of an occupancy matrix of the particle array; and using the mobile optical tweezers for re-arranging particles in the particle array;

wherein re-arranging the particles comprises a row sorting step for arranging particle rows of the target array; and a column compression step for arranging particle columns of the target array;

wherein the row sorting step comprises prioritizing rows that are closest to, or equal to, half-filled.

In accordance with a fourth aspect of the present invention there is provided an optical tweezer arrays system comprising:

means for generating static optical tweezers for the particle array such that a target array and a reservoir array are generated on a substrate, wherein the reservoir array surrounds the target array;

means for generating multiple mobile optical tweezers simultaneously for re-arranging particles in the particle array on the substrate based on an image of the particle array on the substrate representative of an occupancy matrix of the particle array;

wherein the means for generating the mobile optical tweezers is configured such that re-arranging the particles comprises a row sorting step for arranging particle rows of the target array; and a column compression step for arranging particle columns of the target array;

wherein the row sorting step comprises prioritizing rows that are closest to, or equal to, half-filled.

BRIEF DESCRIPTION OF THE DRAWINGS

The invention will be better understood with reference to the detailed description when considered in conjunction with the non-limiting examples and the accompanying drawings, in which.

DETAILED DESCRIPTION

As mentioned in the background section above, defect-free atom arrays are a precursor for quantum information processing and quantum simulation with neutral atoms. Yet, large-scale defect-free atom arrays can be challenging to realize, due to the losses encountered when rearranging stochastically loaded atoms to achieve a desired target array. An example embodiment of the present invention provides a parallel rearrangement algorithm that uses multiple mobile tweezers to independently sort and compress atom arrays in a way that advantageously avoids atom collisions. With a high degree of parallelism, the algorithm according to an example embodiment offers a reduced move complexity compared to both single-tweezer algorithms and existing multitweezer algorithms. The optimal degree of parallelism according to an example embodiment is determined to be a balance between an algorithmic speedup and multitweezer inhomogeneity effects. The defect-free probability for a 225-atom array is demonstrated to be as high as 33(1)% in a room-temperature setup after multiple cycles of rearrangement, according to an example embodiment. The algorithm according to an example embodiment can be implemented for any target array geometry with an underlying periodic structure.

An example embodiment of the present invention implements a rearrangement protocol using multiple tweezers to independently sort and compress atom arrays in parallel. The algorithm according to an example embodiment advantageously avoids coupling among rows and among columns and can ensure collision-free moves. The effects of the parallel sort-and-compression algorithm (PSCA) according to an example embodiment on reducing the rearrangement complexity is quantitatively investigated and compared against existing algorithms. Use of the PSCA according to an example embodiment to achieve a high success probability [33(1)%] of assembling 225-atom defect-free triangle arrays in a room-temperature setup is demonstrated. The PSCA according to an example embodiment is also applied to a range of target array geometries encompassing triangular variants of systems that are interesting for studies of spin frustration and fractal physics.

Figure 1B:
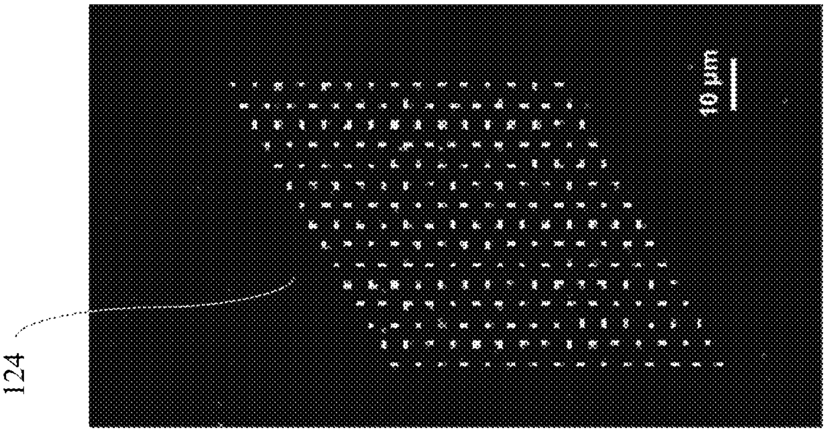
FIG. 1B shows a single-shot fluorescence image of a defect-free triangular array with 225 atoms, according to an example embodiment.
Figure 1A:
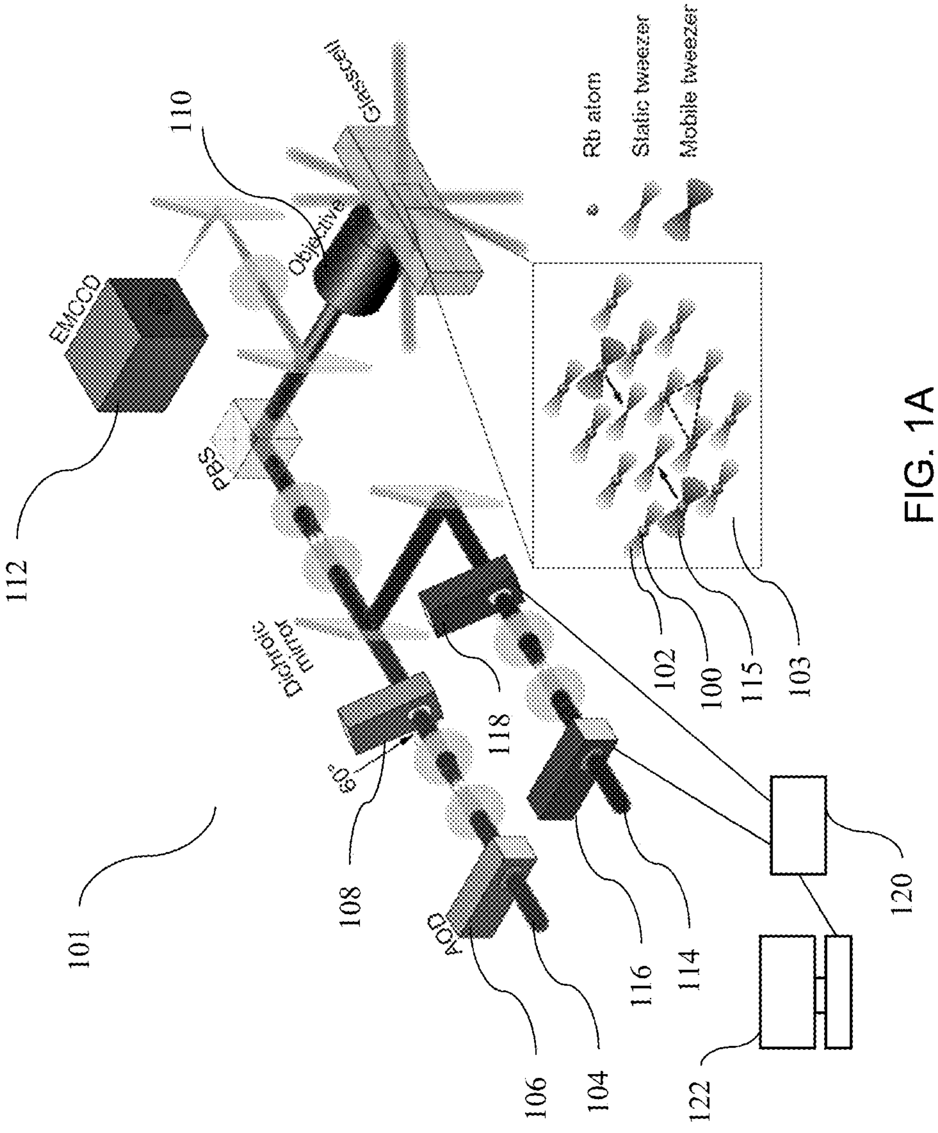
FIG. 1A shows a schematic diagram illustrating that optical tweezer arrays for initial loading and rearrangement of Rb atoms are generated by sending 808-nm (light gray) and 852-nm (dark gray) laser beams through their respective pair of acousto-optic deflectors (AODs), according to an example embodiment. Each AOD pair has a 60° relative orientation. (Inset) The precooled cloud of Rb atoms are stochastically loaded into the static tweezers and rearranged with mobile tweezers into defect-free atom arrays.

With reference to FIG. 1A, in one example embodiment, the experiment sequence begins with loading laser-cooled $^{87}$Rb atoms e.g. 100 into a base array of 20×20 static tweezers e.g. 102 (array partially indicated at numeral 103) at 808 nm over a duration of 500 ms, using an optical tweezer arrays system 101 according to an example embodiment. The initial filling fraction typically ranges from 75% to 78% when D1-enhanced gray molasses loading is used. D1-enhanced gray molasses loading is understood in the art and will not be described in detail herein. Reference is made to [A. Jenkins, J. W. Lis, A. Senoo, W. F. McGrew, and A. M. Kaufman, Ytterbium Nuclear-Spin Qubits in an Optical Tweezer Array, Phys. Rev. X 12, 021027 (2022)], [T. Grünzweig, A. Hilliard, M. McGovern, and M. F. Andersen, Near-deterministic preparation of a single atom in an optical microtrap, Nat. Phys. 6, 951 (2010).], [M. O. Brown, T. Thiele, C. Kiehl, T.-W. Hsu, and C. A. Regal, Gray-Molasses Optical-Tweezer Loading: Controlling Collisions for Scaling Atom-Array Assembly, Phys. Rev. X 9, 011057 (2019).] [M. M. Aliyu, L. Zhao, X. Q. Quek, K. C. Yellapragada, and H. Loh, D1 magic wavelength tweezers for scaling atom arrays, Phys. Rev. Res. 3, 043059 (2021).] and [J. Ang'ong'a, C. Huang, J. P. Covey, and B. Gadway, Gray molasses cooling of 39K atoms in optical tweezers, Phys. Rev. Res. 4, 013240 (2022)] for further details, by way of example only. To generate the static tweezers in the system 101, an 808-nm beam 104 is propagated through a pair of acousto-optic deflectors 106, 108 (AODs), which are oriented at 60° relative to each other, before being focused down with a microscope objective 110 (NA=0.5). This system 101 allows the generation of a Talbot-free equilateral triangular atom array, as a non-limiting example, as shown in FIG. 1B. The static tweezer AODs 106, 108 are driven by software-defined radio to split the static tweezer light beam 104 to produce an array (compare numeral 103) with an atomic spacing of 4.49(1) μm.

Using measurements of the Stark shift, the average trap depth is determined to be 300 μK with 4% inhomogeneity (relative standard deviation) across the array. The 808-nm tweezer axial and radial trap frequencies are determined to be 9.0(4) and 57(2) kHz, respectively, while the trap waist was 0.98(2) μm.

To transform the randomly loaded atom array (compare numeral 103) to a defect-free array, the initial array is first imaged by collecting fluorescence photons on an electron multiplying charge-coupled device (EMCCD) camera 112 in 45 ms. Each site of the tweezer array is precalibrated with a set of coordinates $\{r\}_{i,j}$ with an associated region of interest and a fluorescence threshold $T_{i,j}$ to determine if the site is loaded with an atom. This calibration converts the image of the array into a binary occupancy matrix that is then passed into the algorithm according to an example embodiment, which calculates a sequence of required moves for rearranging the atoms into a user-defined target pattern.

The physical moving of the atoms is performed by an auxiliary set of mobile tweezers e.g. 115 that is spatially overlapped with the static tweezers e.g. 102. The mobile tweezers e.g. 115 are formed by deflecting 852-nm light 114 with another pair of AODs 116, 118 that are driven by a two-channel arbitrary waveform generator 120 (AWG, not shown). Individual waveforms for transporting an atom from one site to another are precalculated and stored in the random access memory of a computer 122 coupled to the AWG 120. The computer 122 then picks, sums (if multiple atoms are involved in a single move), and concatenates the waveforms before loading them onto the AWG 120. Subsequently, the AODs 116, 118 deflect the mobile tweezer light 114 accordingly. During this stage,-enhanced gray molasses cooling is applied.

As is understood in the art, both the arbitrary waveform generator and software-defined radio described above are devices capable of producing analog signals from a user-specified sequence of digital samples. Software-defined radios, however, tend to have additional signal processing components such as mixers, filters or modulators that are implemented via software instead of the usual analog hardware. The software-defined radio is then able to apply such components with the digital samples to varying extents programmatically.

It is noted that using respective pairs of AODs 106, 108 and 116, 118, respectively, for the static tweezers for the base array and the mobile tweezers for re-arrangement can have the advantage of avoiding incorporating a dedicated additional control mechanism and associated devices, for example spatial light modulators (SLMs) such as digital micromirror devices (DMDs) or liquid crystal on silicon spatial light modulators (LCOSSLMs) for the static tweezers.

Typically, to transfer atoms from the static tweezers e.g. 102 to the mobile tweezers e.g. 115, the latter is ramped up to a trap depth of 2.1 mK in 60 μs when up to 20 mobile tweezers are simultaneously turned on, in one example embodiment. At this trap depth, the axial and radial trap frequencies are 23.4(8) and 145(3) kHz, respectively, while the trap waist is 0.98(1) μm. The atoms are then transported at a constant speed of 130 μm ms$^{-1}$, during which they are constrained to move along the rows and columns spanned by the static tweezers e.g. 102. The transport time is adiabatic compared to the static tweezer e.g. 102 radial trap frequencies, thereby minimizing the periodic perturbations to the potential experienced by the transported atoms as they traverse the static tweezers e.g. 102. When the atoms have reached their target positions, the mobile tweezers e.g. 115 are ramped down to zero in another 60 μs. At each joint of the ramp and transport, the phases of each waveform are matched, so that the atom in motion does not experience any sudden jumps in the mobile tweezer e.g. 115 potential during rearrangement.

After the rearrangement, another fluorescence image is taken to verify the atom occupancy. FIG. 1B shows a single-shot image of a defect-free triangular array 124 with 225 atoms.

Figure 2A:
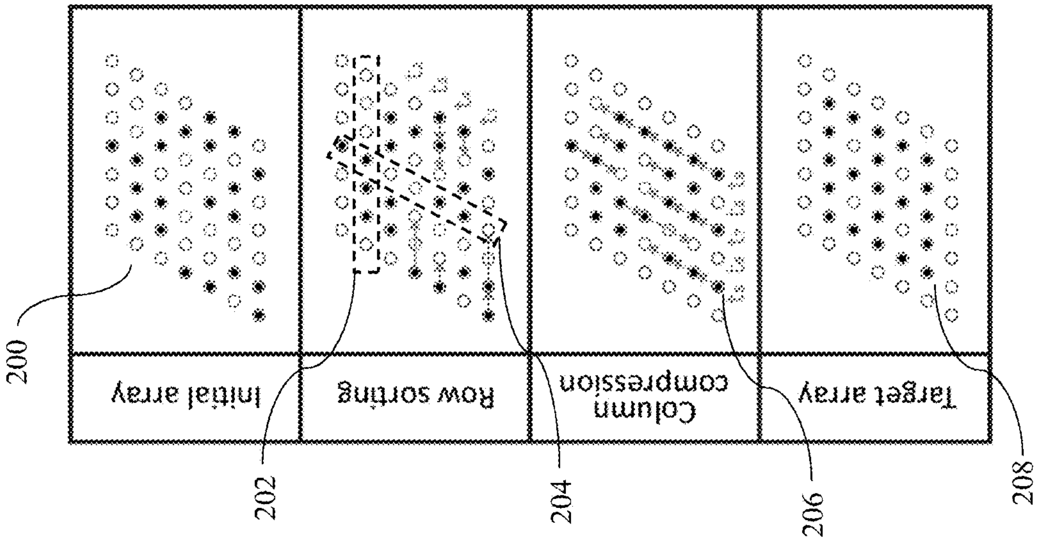
FIG. 2A shows schematic drawings illustrating the basic steps for the assembly of a defect-free kagome array using the multitweezer PSCA according to an example embodiment. The darker and lighter open circles denote reservoir and target sites, respectively. The black filled circles denote atoms, and the arrows indicate the action of the mobile tweezers. The moves labelled by the same $t_i$ take place simultaneously.

Parallel Sort-and-Compression Algorithm and Results According to an Example Embodiment With reference to FIG. 2A, the rearrangement algorithm according to an example embodiment starts by identifying the center region (lighter circles) of the base array 200 as the target and its surrounding rows and columns (darker circles) as the reservoir, from which atoms are withdrawn to fill the target array. The PSCA according to an example embodiment comprises two parts: row sorting and column compression. Due to the stochastic nature of loading single atoms into the base array 200, the initial number of atoms present in each column can vary. Further, for arbitrary geometries, the atoms needed in each column can be different, e.g., for the kagome array, some columns are half-filled. The row-sorting procedure according to an example embodiment redistributes the atoms among different columns such that each column has the same number of atoms as required in the target array. The row sorting according to an example embodiment is done row e.g. 202 by row and each instance of row sorting aims to help the columns e.g. 204 that are most in need of atoms. It was found that the choice of which rows to sort first can affect the efficiency of the row-sorting procedure. In the example embodiment, a heuristic that prioritizes rows that are closest to, or equal to, half-filled is chosen. It was found that this heuristic performs better than prioritizing rows that are least or most filled, as half-filled rows have the best balance between the number of atoms that can support other columns and vacancies to redistribute to. The column compression then moves the atoms column by column into their target positions, indicated e.g. at numeral 206. FIG. 2A shows an example of rearranging a stochastically loaded 7×7 array into a defect-free kagome array 208 in steps $t_1$ to $t_9$, which can include multiple-atoms movements, here $t_1$, $t_3$, $t_5$-$t_9$.

For each case of row sorting/column compression, all the atoms move within the same row/column independently of other rows/columns. Further, the order of the atoms is preserved after the rearrangement, i.e., the atoms do not swap positions during the move. As a result, atom loss from collisions is advantageously avoided, according to an example embodiment.

Reduced Move Complexity According to an Example Embodiment

In real-time atom rearrangement, transporting the atoms typically takes an order of magnitude more time compared to calculating the moves. Therefore, minimizing the move complexity (i.e., number of moves) is desirable for rearrangement algorithms.

The PSCA according to an example embodiment partitions the two-dimensional array formation optimization problem into a number of one-dimensional optimization problems, i.e. rows and columns processing as described above. The optimized one-dimensional moves can be carried out simultaneously, which takes much less time compared to single-tweezer algorithms where these moves need to be done sequentially.

Figure 2B:
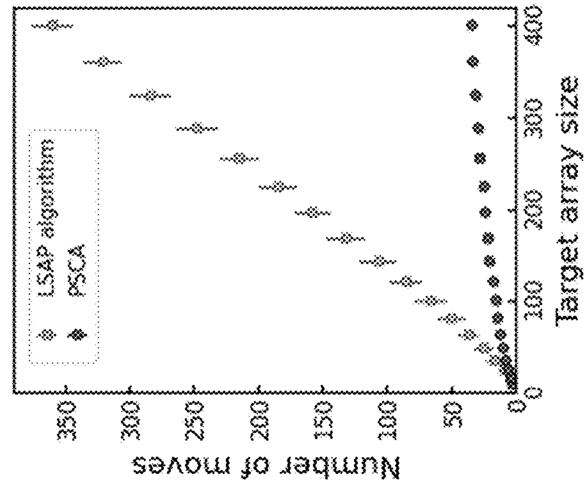
FIG. 2B shows simulated scaling of the number of moves for different compact target array sizes using the parallel sort-and-compression algorithm (PSCA) according to an example embodiment (circles) and the modified LSAP algorithm (squares). The simulations are run with 10 000 iterations of different random initial loading configurations.

To evaluate the efficiency of the PSCA according to an example embodiment, the move complexity of the algorithm is first compared against the modified LSAP algorithm for a compact target array. The modified LSAP algorithm is chosen here for comparison as it has been previously demonstrated to be more efficient than both the conventional LSAP solver and greedy algorithms for generating compact arrays. In the simulation, the rearrangement strategy using both algorithms applied to different random initial atom arrays with a loading probability per site of 75% are solved. Running the simulations multiple times for a given target array size N spanned by L rows and L columns, where L×L=N, yields a distribution of moves. N is then varied to simulate the move complexity. FIG. 2B shows the scaling of the number of moves for different target array sizes using the two algorithms, where the PSCA according to an example embodiment invokes up to 15 simultaneous mobile tweezers. With increasing target array size N, the average number of moves scales as $N^{1.16(1)}$ for the modified LSAP algorithm [squares], whereas it only scales as $N^{0.48(2)}$ for the PSCA according to an example embodiment (circles).

The PSCA according to an example embodiment advantageously avoids redundancy in moves with its heuristic row-sorting strategy described above, which advantageously ensures the ability to shift the surplus atom from one column to any other column with one move. As a result, moves that would be propagating defects through columns until a column with an atom surplus is reached can be avoided.

The PSCA according to an example embodiment advantageously uses a reservoir array around the target array, which requires at most one compression operation to complete rearranging one column, as described above. This can avoid requiring up to two scans (one downward and one upward) to complete rearranging one row, as would e.g. be the case where the target and reservoir arrays are such that the reservoir rows are interleaved as alternating rows between the target array rows.

Figure 3A:
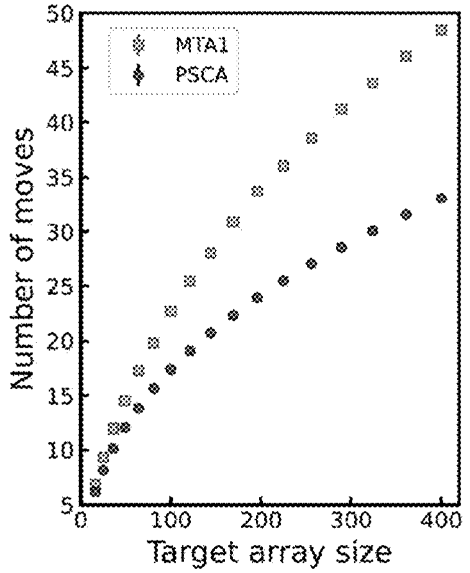
FIG. 3A shows simulated scaling of the number of moves for different target array sizes using the PSCA according to an example embodiment (circles) and an existing multitweezer algorithm (squares).

To evaluate the extent of parallelism, the move complexity of the PSCA according to an example embodiment is compared with an existing multitweezer algorithm. For both algorithms, the simulations are conducted with the geometry and initial loading probability (55%) from [S. Ebadi, T. T. Wang, H. Levine, A. Keesling, G. Semeghini, A. Omran, D. Bluvstein, R. Samajdar, H. Pichler, W. W. Ho, S. Choi, S. Sachdev, M. Greiner, V. Vuletic, and M. D. Lukin, Quantum phases of matter on a 256-atom programmable quantum simulator, Nature 595, 227 (2021)]. FIG. 3A shows the scaling of the number of moves for different target array sizes using the two algorithms. We find that the average number of moves scales as $N^{0.47(1)}$ for the existing algorithm (squares), whereas it scales as $N^{0.388(2)}$ for PSCA according to an example embodiment (circles).

Figure 3B:
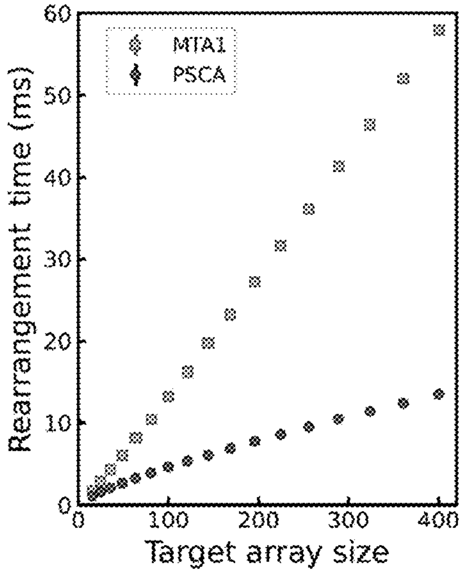
FIG. 3B shows simulated scaling of the atom rearrangement time for different target array sizes using the PSCA according to an example embodiment (circles) and an existing multitweezer algorithm (squares). 10 000 iterations of the simulation are run with different random initial loading configurations. The error bars are smaller than the marker size on the plots.

The PSCA according to an example embodiment also advantageously avoids additional wait times since at least one atom will be moving, being captured or released at any given time, as compared to algorithms in which a wait duration is inherently included at each row/column. The simulation is extended to compare the time taken by both algorithms to rearrange atom arrays with different sizes as shown in FIG. 3B, where the moving speed and capture time from [S. Ebadi, T. T. Wang, H. Levine, A. Keesling, G. Semeghini, A. Omran, D. Bluvstein, R. Samajdar, H. Pichler, W. W. Ho, S. Choi, S. Sachdev, M. Greiner, V. Vuleti'c, and M. D. Lukin, Quantum phases of matter on a 256-atom programmable quantum simulator, Nature 595, 227 (2021)] are used. For a target array size of 400 atoms, PSCA according to an example embodiment requires only a quarter of the atom-rearrangement time (excluding hardware delays) compared to that of the existing algorithm.

As a multitweezer algorithm, the PSCA according to an example embodiment offers a tunable degree of parallelism (DOP), which is defined herein to be a constraint on the maximum number of tweezers allowed to be turned on for each move. In other words, in the PSCA according to an example embodiment, the maximum number of mobile optical tweezers for re-arranging the particles is variable to vary a degree of parallelism. For example, if one parallel move includes moving seven atoms in a column, where DOP=4 and hence the maximum number of tweezers allowed to be tuned on is 4, the rearrangement will be separated into two moves with four atoms and three atoms moved, respectively.

Figure 2C:
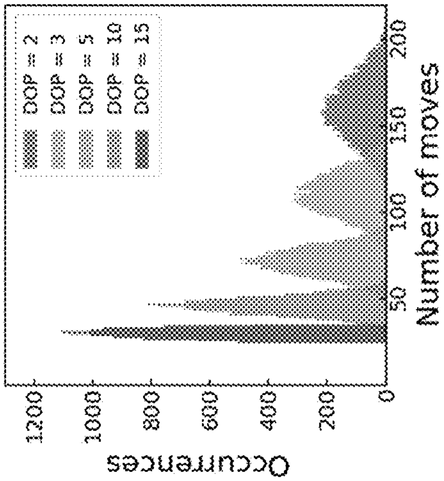
FIG. 2C shows a simulated histogram of the number of moves to generate 15-by-15 compact target arrays with different degrees of parallelism (DOP)s.

FIG. 2C shows a histogram of the number of moves required by the PSCA according to an example embodiment for the rearrangement with different DOPs applied to obtain a 15×15 target array. The average number of moves required for rearrangement decreases significantly from 160.0(2) to 29.61(3) as the DOP increases from 2 to 15, indicating that a higher DOP is more efficient.

Mitigation of Multitweezer Inhomogeneities According to an Example Embodiment While multiple mobile tweezers can speed up the rearrangement process, they also require extra care to minimize the trap inhomogeneity during rearrangement, which can otherwise be detrimental to the atoms. Discussed below are two sources of trap inhomogeneity: first, for a given number of tweezers, intermodulation among different rf tones sent to the AODs can generate an array with unequal trap depths; second, the average trap depth depends on the number of mobile tweezers that are simultaneously turned on.

RF intermodulation: the generation of multiple tweezers requires sending multiple rf tones to the AODs. Nonlinearities in the AODs and rf amplifiers cause intermodulation (frequency mixing) among the different tones, which becomes stronger when more tones are sent to the AODs and when their phases are strongly correlated. To mitigate the intermodulation, the initial phases assigned to the rearrangement waveforms are randomized. Using these initial phases, an inhomogeneity (relative standard deviation) of 2% within a row or column of 20 mobile tweezers at fixed array positions is achieved by adjusting the amplitudes of the different rf tones, according to an example embodiment. These optimized amplitudes are henceforth considered "preassigned" during rearrangement.

In theory, the phases can be further optimized to suppress the intermodulation and achieve better homogeneity if the required individual waveforms that need to be summed are known and static. However, the optimization cannot be carried out in real time when the frequencies are swept. Thus, a list of initial phases is randomly assigned to the individual waveforms in advance to enable real-time AOD control, according to an example embodiment.

Tweezer-number-dependent trap depth: during rearrangement, the number of mobile tweezers turned on can vary depending on the number of vacancies present in a row or column. Since the initial array loading is stochastic, the number of mobile tweezers required for different moves is also probabilistic.

To generate a given number of mobile tweezers, a subset of the rf tones with preassigned amplitudes are turned on. It is observed that as more tones are turned on simultaneously, the average mobile trap depth decreases, leading to greater losses during atom transportation. In principle, one can increase the overall tweezer power to compensate for the drop in average trap depth. However, too high a trap depth can lead to losses arising from nonadiabatic transfers between the mobile and static tweezers. In other words, increasing the average trap depth does not eliminate losses, because its improvement of the rearrangement fidelity for moves involving many mobile tweezers comes at a cost of lower fidelity for few tweezers.

Optimal Degree of Parallelism According to an Example Embodiment

As described above, a higher DOP yields a faster rearrangement, which improves the survival probability of an atom with a finite trap lifetime. On the other hand, a higher DOP can reduce the rearrangement fidelity by introducing more inhomogeneity in the mobile tweezer trap depths. In the following, it is sought to find an optimal DOP by balancing the two effects against each other, according to an example embodiment.

Of the two effects, the speedup in rearrangement time is considered first. The actual time taken for rearrangement varies from shot to shot and depends on how much the stochastically loaded initial array deviates from the target. In an experiment control sequence, a time window ranging from 60 to 200 ms is reserved, within which the rearrangement can be completed for most of the shots. Higher DOPs are more efficient and afford shorter time windows, which lead to higher atom survival probabilities in the presence of a finite trap lifetime (see curve 400 in FIG. 4).

Figure 4:
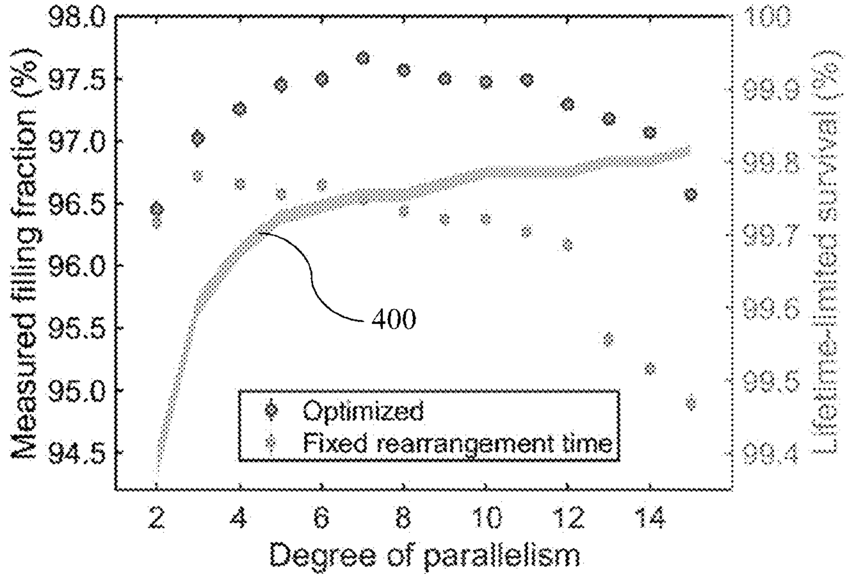
FIG. 4 shows a graph illustrating measured filling fractions achieved with different degrees of parallelism for a 15×15 compact array after one rearrangement cycle. An algorithm with higher DOP performs the rearrangement more quickly, which increases the survival probability of the atoms given the trap lifetime decay (gray curve, y axis on the right, calculated with a precalibrated trap lifetime T=33(1) s). However, the higher DOP also leads to more intermodulation, which causes intensity fluctuations that heat up the atoms (squares, data taken with fixed rearrangement time of 200 ms). The overall measured filling fraction, taken with optimized rearrangement time windows, is highest when there is a trade-off between the two effects (circles).

On the other hand, the reduced rearrangement fidelity from a higher DOP can overwhelm the benefit of a speedup. To isolate the effect of multitweezer inhomogeneity, the rearrangement time window for all DOPs is set to be 200 ms, which gives a constant lifetime-related loss that can be factored out. FIG. 4 shows that the filling fraction in a 15×15 compact target array decreases as the DOP increases from 3 to 15 (squares), which can be attributed to the increased inhomogeneity in mobile tweezer trap depths. The low filling fraction with DOP=2 is an exception and comes from the fact that the variance of the rearrangement time is so large that 0.8% of the shots cannot be rearranged within the 200 ms time window. It is further postulated that from DOP=12 to DOP=13, the mobile tweezer trap depth could have decreased below a threshold for adiabatic atom transport, such that the rearrangement fidelity is more significantly affected for DOP≥13.

Combining these two effects, the rearrangement time window for different DOPs used to form the same 15×15 target array is optimized. The measured filling fractions with optimized time windows are shown as circles in FIG. 4. The filling fraction increases initially, boosted by the reduced complexity of the PSCA, before declining at high DOP where the intermodulation effects dominate. At the optimal point (DOP=7), a measured filling fraction of 97.66(4)% is achieved for an optimized example embodiment.

Multicycle Rearrangement According to an Example Embodiment

Rearrangement losses from finite transit duration, tweezer intensity fluctuations, and imperfect capture and release of atoms from the mobile tweezers can introduce defects in the rearranged array. An effective solution is to use multiple rearrangement cycles to correct for defects arising from the previous cycles. These subsequent cycles require fewer moves and shorter rearrangement time, thereby leading to lower loss and higher filling fractions.

Figure 5:
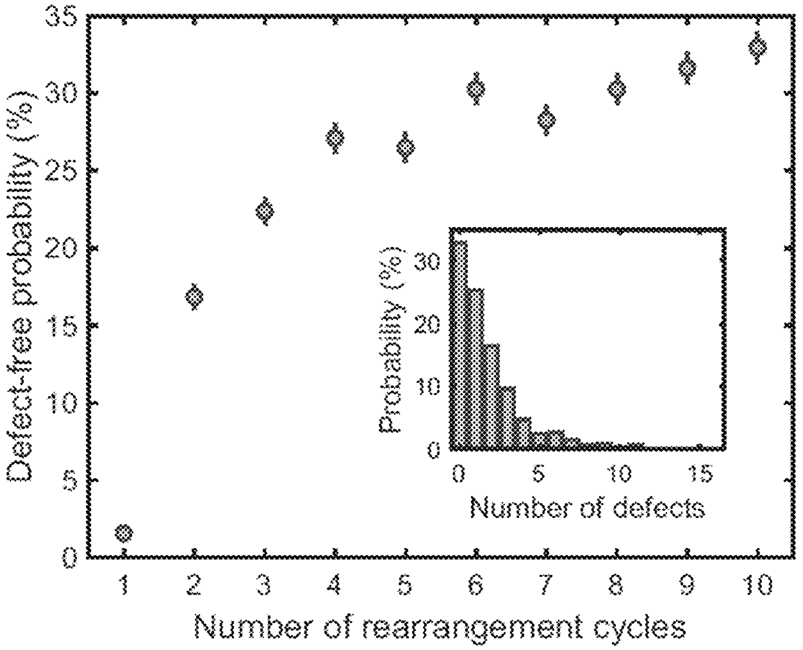
FIG. 5 shows a graph illustrating improvement of the defect-free probability with multiple cycles of rearrangement for a 225-atom compact target array (DOP=7), according to an example embodiment. The defect-free probability increased to 33(1)% after ten cycles. The error bars correspond to 10 equal-tailed Jeffrey's prior confidence intervals. (Inset) Measured probability distribution of defects after ten rearrangement cycles.
Figure 6A:
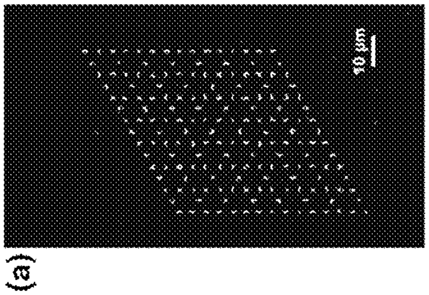
FIG. 6A shows a single-shot image of defect-free atom arrays with kagome geometry. Scale bar indicate a distance of 10 μm in the atom plane.
Figure 6B:
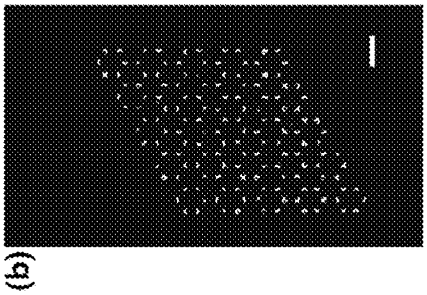
FIG. 6B shows a single-shot image of defect-free atom arrays with honeycomb geometry. Scale bar indicate a distance of 10 μm in the atom plane.
Figure 6C:
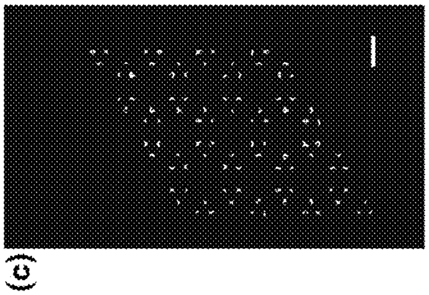
FIG. 6C shows a single-shot image of defect-free atom arrays with link kagome geometry. Scale bar indicate a distance of 10 μm in the atom plane.
Figure 6D:
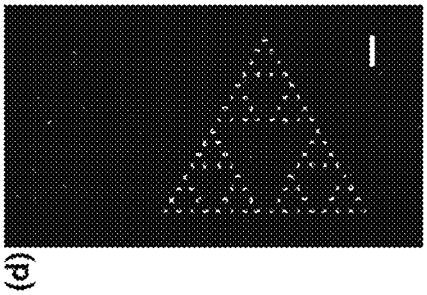
FIG. 6D shows a single-shot image of defect-free atom arrays with Sierpinski triangle geometry. Scale bar indicate a distance of 10 μm in the atom plane.
Figure 6E:
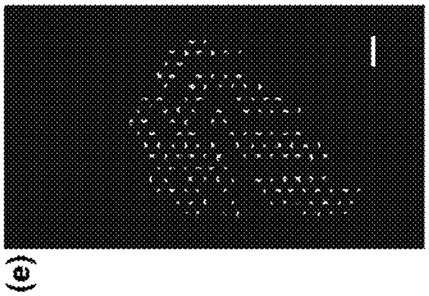
FIG. 6E shows a single-shot image of defect-free atom arrays with lion head symbol geometry. Scale bar indicate a distance of 10 μm in the atom plane.

FIG. 5 shows the 225-atom array defect-free probability increasing as more rearrangement cycles are used, which corresponds to fewer defects that remain to be corrected over time. The target geometry is a compact triangular array and DOP=7 is set as optimized (see above description). It is found that the defect-free array probability improves from 1.5(3)% to 16.9(8)% after a second rearrangement cycle. After ten rearrangement cycles, the defect-free probability stabilizes at 33(1)%, which is an order-of-magnitude increase compared to one round of rearrangement while the experiment cycle time only increases by a factor of 1.8. The measured probability distribution of defects after ten rearrangement cycles is shown as an inset in FIG. 5.

The defect-free array probability increases the most significantly at the second rearrangement cycle. This comes from the fact that the first rearrangement involves moving almost all the atoms as the initially loaded array is sparse. Given that the rearrangement losses scale as the number of atoms being moved, the first cycle results in a relatively low defect-free probability. For subsequent cycles, the arrays that need to be rearranged typically have a filling fraction over 97% and only a few atoms (2.7 atoms on average) need to be moved. As a result, the rearrangement loss is exponentially lower, which leads to a significant increase in the defect-free probability. Besides rearrangement losses, the other factors that limit the measured defect-free array probability include false detection of the atom occupation [mean detection fidelity 99.946(7)%] and heating from atom fluorescence imaging [survival probability of 99.55(1)% after one round of imaging]. These are the same factors that set the upper bound on the defect-free array probability as the number of rearrangement cycles increases.

Arbitrary Geometries According to Example Embodiments

Besides compact triangle arrays, the PSCA can also generate any user-defined arbitrary geometry with an underlying periodic structure. FIG. 6 shows single-shot example images of defect-free atom arrays for the kagome, honeycomb, link kagome, and Sierpinski triangle geometries, as well as the lion head symbol, which is an icon of Singapore.

As described herein, a parallel rearrangement system and algorithm for defect-free atom array assembly are provided according to an example embodiment, with an adjustable degree of parallelism corresponding to a constraint on the maximum number of mobile tweezers. For a 225-atom target array and DOP=15, the parallel rearrangement system and algorithm according to an example embodiment significantly reduces the average number of moves to scale as the square root of the target array size. Large-scale defect-free arrays with hundreds of atoms are realized with a high success probability up to 33(1)% in a room-temperature environment, according to an example embodiment.

In one embodiment, an optical tweezer arrays system is provided comprising first and second optical paths from respective light sources to a substrate; and a sensor for imaging the particle array; wherein the first optical path comprises a first pair of acousto-optic deflectors configured for deflecting a first light beam for generating static optical tweezers for the particle array on the substrate; and wherein the second optical path comprises a second pair of acousto-optic deflectors configured for deflecting a second light beam for generating multiple mobile optical tweezers simultaneously for re-arranging particles in the particle array on the substrate.

A maximum number of mobile optical tweezers for re-arranging the particles may be variable to vary a degree of parallelism.

The optical tweezer arrays system may comprise an objective element disposed in the first and second optical paths for focusing the first and second light beams onto the substrate. The objective element may be disposed in a third optical path between the sensor and the substrate.

The first and second optical paths may coincide for respective portions thereof. The respective portions may comprise the objective element.

The first pair of acousto-optic deflectors may be configured for deflecting the first light beam for generating the static optical tweezers for the particle array on the substrate such that a target array and a reservoir array are generated on the substrate. The reservoir array may surround the target array. The reservoir array may completely surround the target array.

The second pair of acousto-optic deflectors may be configured for deflecting the second light beam for generating the mobile optical tweezers for re-arranging particles in the particle array on the substrate based on an image taken by the sensor of the particle array on the substrate representative of an occupancy matrix of the particle array. The second pair of acousto-optic deflectors may be configured for deflecting the second light beam for generating the mobile optical tweezers for re-arranging particles in the particle array on the substrate in a sequence of re-arrangement cycles, based on respective images taken by the sensor of the particle array on the substrate representative of the occupancy matrix of the particle array prior to each re-arrangement cycle.

Figure 7:
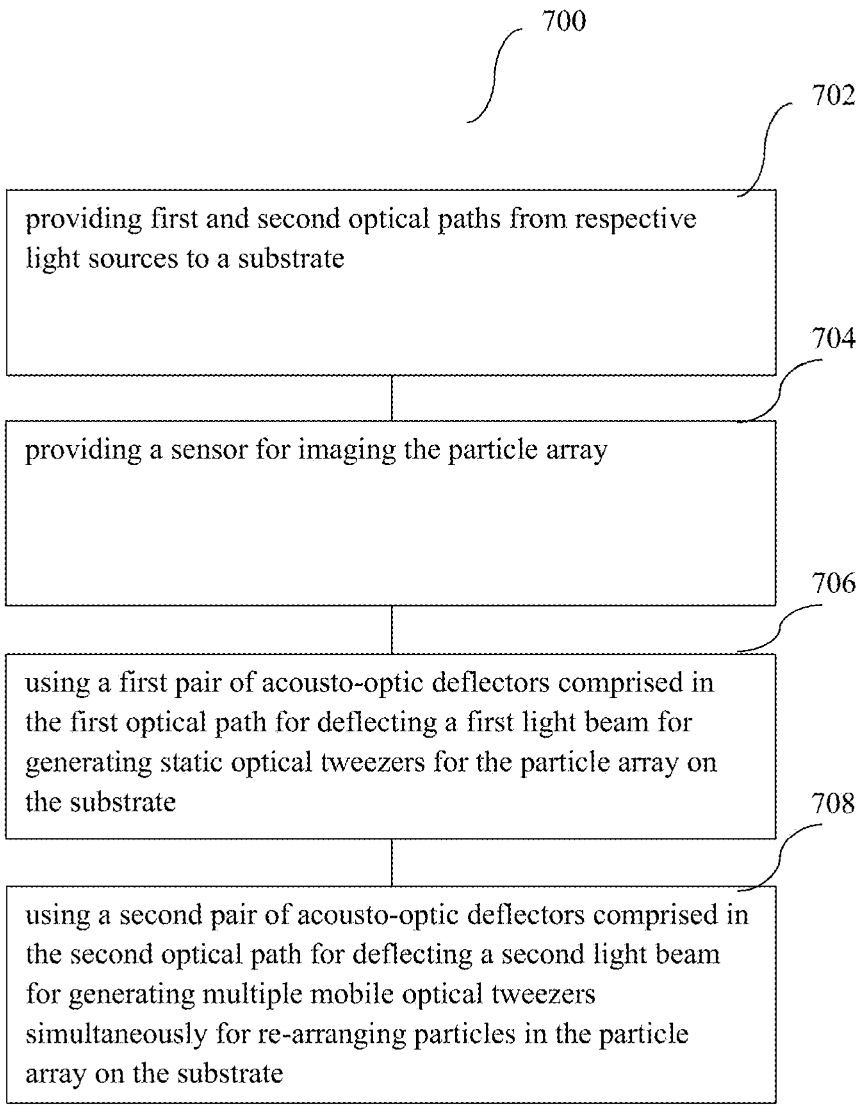
FIG. 7 shows a flowchart illustrating a method of arranging a particle array, according to an example embodiment.

FIG. 7 shows a flowchart 700 illustrating a method of arranging a particle array, according to an example embodiment. At step 702, first and second optical paths from respective light sources to a substrate are provided. At step 704, a sensor for imaging the particle array is provided. At step 706, a first pair of acousto-optic deflectors comprised in the first optical path is used for deflecting a first light beam for generating static optical tweezers for the particle array on the substrate. At step 708, a second pair of acousto-optic deflectors comprised in the second optical path is used for deflecting a second light beam for generating multiple mobile optical tweezers simultaneously for re-arranging particles in the particle array on the substrate.

A maximum number of mobile optical tweezers for re-arranging the particles may be varied to vary a degree of parallelism.

An objective element may be disposed in the first and second optical paths and using the objective element for focusing the first and second light beams onto the substrate. The objective element may be disposed in a third optical path between the sensor and the substrate.

The first and second optical paths may coincide for respective portions thereof. The respective portions may comprise the objective element.

The first pair of acousto-optic deflectors may be configured for deflecting the first light beam for generating the static optical tweezers for the particle array on the substrate such that a target array and a reservoir array are generated on the substrate. The reservoir may array surround the target array. The reservoir array may completely surround the target array.

The second pair of acousto-optic deflectors may be configured for deflecting the second light beam for generating the mobile optical tweezers for re-arranging particles in the particle array on the substrate based on an image taken by the sensor of the particle array on the substrate representative of an occupancy matrix of the particle array. The second pair of acousto-optic deflectors may be configured for deflecting the second light beam for generating the mobile optical tweezers for re-arranging particles in the particle array on the substrate in a sequence of re-arrangement cycles, based on respective images taken by the sensor of the particle array on the substrate representative of the occupancy matrix of the particle array prior to each re-arrangement cycle.

Figure 8:
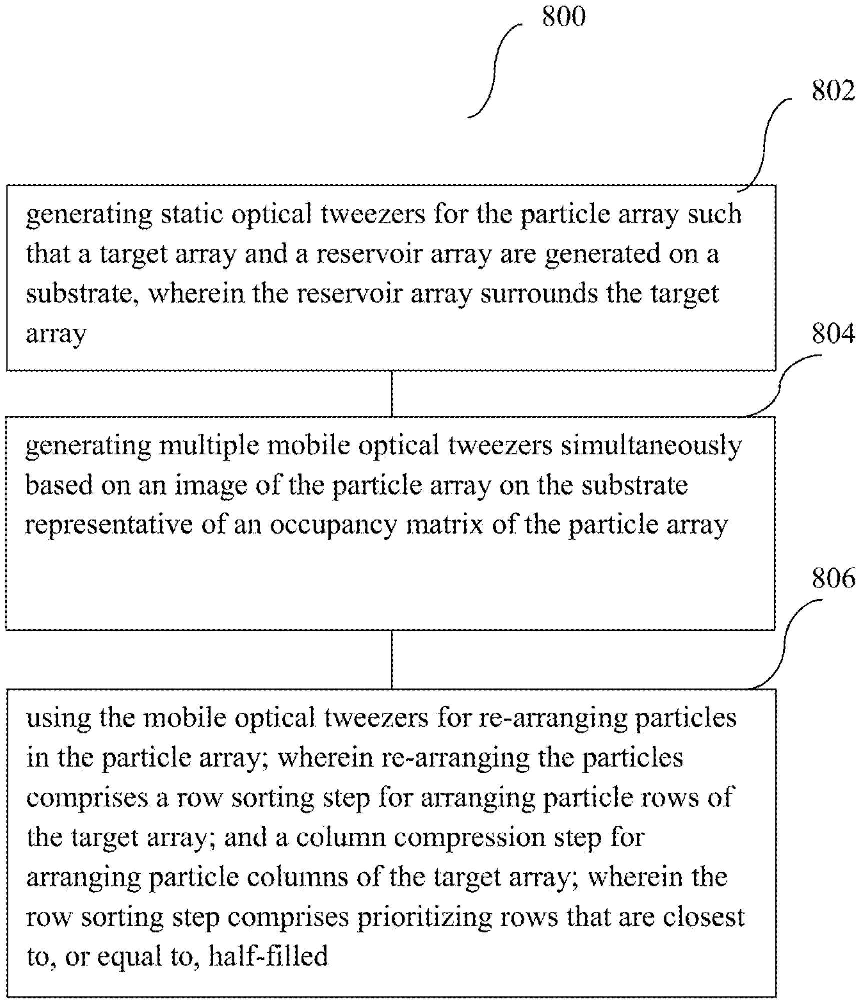
FIG. 8 shows a flowchart illustrating a method of arranging a particle array, according to an example embodiment.

FIG. 8 shows a flowchart 800 illustrating a method of arranging a particle array, according to an example embodiment. At step 802, static optical tweezers for the particle array are generated such that a target array and a reservoir array are arranged on a substrate, wherein the reservoir array surrounds the target array. At step 804, multiple mobile optical tweezers are simultaneously generated based on an image of the particle array on the substrate representative of an occupancy matrix of the particle array. At step 806, the mobile optical tweezers are used for re-arranging particles in the particle array; wherein re-arranging the particles comprises a row sorting step for arranging particle rows of the target array; and a column compression step 808 for arranging particle columns of the target array, wherein the row sorting step comprises prioritizing rows that are closest to, or equal to, half-filled.

A maximum number of mobile optical tweezers for re-arranging the particles may be variable to vary a degree of parallelism.

The reservoir array may completely surround the target array.

The mobile optical tweezers for re-arranging particles in the particle array on the substrate may be generated in a sequence of re-arrangement cycles, based on respective images taken of the particle array on the substrate representative of the occupancy matrix of the particle array prior to each re-arrangement cycle.

In one embodiment, optical tweezer arrays system comprises means for generating static optical tweezers for the particle array such that a target array and a reservoir array are generated on a substrate, wherein the reservoir array surrounds the target array; means for generating multiple mobile optical tweezers simultaneously for re-arranging particles in the particle array on the substrate based on an image of the particle array on the substrate representative of an occupancy matrix of the particle array; wherein the means for generating the mobile optical tweezers is configured such that re-arranging the particles comprises a row sorting step for arranging particle rows of the target array; and a column compression step for arranging particle columns of the target array; wherein the row sorting step comprises prioritizing rows that are closest to, or equal to, half-filled.

A maximum number of mobile optical tweezers for re-arranging the particles may be variable to vary a degree of parallelism.

The reservoir array may completely surround the target array.

The means for generating the mobile optical tweezers may be configured for re-arranging particles in the particle array on the substrate in a sequence of re-arrangement cycles, based on respective images taken of the particle array on the substrate representative of the occupancy matrix of the particle array prior to each re-arrangement cycle.

The means for generating the static optical tweezers may comprise a spatial light modulator or a first pair of acousto-optic deflectors.

The means for generating the mobile optical tweezers may comprise a second pair of acousto-optic deflectors.

The means for generating the mobile optical tweezers may comprise a sensor for imaging the particle array.

The rearrangement system and algorithm according to an example embodiment can be applied or adapted to most atom-array setups including mixed species and molecule systems. Moreover, the results reported for an example embodiment herein are obtained with tapered amplifiers as the laser sources for both the static and mobile tweezers. It is expected that the defect-free success probability can be further improved with quieter and more powerful laser sources like titanium sapphire ring lasers. Such scaling up of atom arrays holds exciting possibilities according to various example embodiments of the present invention for explorations of exotic quantum phenomena and for achieving higher quantum computation power.

Aspects of the systems and methods described herein such as the calculation of the moves and the control of the components of the optical tweezer arrays system according to an example embodiment may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. When received into any of a variety of circuitry (e.g. a computer), such data and/or instruction may be processed by a processing entity (e.g., one or more processors).

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

For example, while in a preferred embodiment, the algorithm according to an example embodiment is implemented in an optical tweezer arrays system according to an example embodiment, the algorithm according to an example embodiment can be implemented in a different optical tweezer arrays system and/or another algorithm can be implemented in an optical tweezer arrays system according to an example embodiment.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The invention claimed is:

1. An optical tweezer arrays system comprising:
- first and second optical paths from respective light sources to a substrate; and
- a sensor for imaging the particle array;
- wherein the first optical path comprises a first pair of acousto-optic deflectors configured for deflecting a first light beam for generating static optical tweezers for the particle array on the substrate;
- wherein the second optical path comprises a second pair of acousto-optic deflectors configured for deflecting a second light beam for generating multiple mobile optical tweezers simultaneously for re-arranging particles in the particle array on the substrate; and
- wherein the second pair of acousto-optic deflectors is configured for re-arranging the particles by performing
- a row sorting step for arranging particle rows of the target array; and
- a column compression step for arranging particle columns of the target array;
- wherein the row sorting step comprises prioritizing rows that are closest to, or equal to, half-filled.

2. The optical tweezer arrays system of claim 1, wherein a maximum number of mobile optical tweezers for re-arranging the particles is variable to vary a degree of parallelism.

3. The optical tweezer arrays system of claim 1, comprising an objective element disposed in the first and second optical paths for focusing the first and second light beams onto the substrate, and optionally wherein the objective element is disposed in a third optical path between the sensor and the substrate.

4. The optical tweezer arrays system of claim 1, wherein the first and second optical paths coincide for respective portions thereof, and optionally wherein the respective portions comprise an objective element disposed in the first and second optical paths for focusing the first and second light beams onto the substrate.

5. The optical tweezer arrays system of claim 1, wherein the first pair of acousto-optic deflectors is configured for deflecting the first light beam for generating the static optical tweezers for the particle array on the substrate such that a target array and a reservoir array are generated on the substrate, and optionally wherein the reservoir array surrounds the target array.

6. The optical tweezer arrays system of claim 5, wherein the reservoir array completely surrounds the target array.

7. The optical tweezer arrays system of claim 1, wherein the second pair of acousto-optic deflectors is configured for deflecting the second light beam for generating the mobile optical tweezers for re-arranging particles in the particle array on the substrate based on an image taken by the sensor of the particle array on the substrate representative of an occupancy matrix of the particle array.

8. The optical tweezer arrays system of claim 7, wherein the second pair of acousto-optic deflectors is configured for deflecting the second light beam for generating the mobile optical tweezers for re-arranging particles in the particle array on the substrate in a sequence of re-arrangement cycles, based on respective images taken by the sensor of the particle array on the substrate representative of the occupancy matrix of the particle array prior to each re-arrangement cycle.

9. A method of arranging a particle array comprising the steps of:
- providing first and second optical paths from respective light sources to a substrate;
- providing a sensor for imaging the particle array;
- using a first pair of acousto-optic deflectors comprised in the first optical path for deflecting a first light beam for generating static optical tweezers for the particle array on the substrate; and
- using a second pair of acousto-optic deflectors comprised in the second optical path for deflecting a second light beam for generating multiple mobile optical tweezers simultaneously for re-arranging particles in the particle array on the substrate;
- wherein re-arranging the particles comprises
  - a row sorting step for arranging particle rows of the target array; and
  - a column compression step for arranging particle columns of the target array;
- wherein the row sorting step comprises prioritizing rows that are closest to, or equal to, half-filled.

10. The method of claim 9, comprising varying a maximum number of mobile optical tweezers for re-arranging the particles to vary a degree of parallelism.

11. The method of claim 9, comprising disposing an objective element in the first and second optical paths and using the objective element for focusing the first and second light beams onto the substrate, and optionally comprising disposing the objective element in a third optical path between the sensor and the substrate.

12. The method of claim 9, wherein the first and second optical paths coincide for respective portions thereof, and optionally wherein the respective portions comprise an objective element disposed in the first and second optical paths used for focusing the first and second light beams onto the substrate.

13. The method of any one of claim 9, comprising configuring the first pair of acousto-optic deflectors for deflecting the first light beam for generating the static optical tweezers for the particle array on the substrate such that a target array and a reservoir array are generated on the substrate.

14. The method of claim 13, wherein the reservoir array surrounds the target array, and optionally wherein the reservoir array completely surrounds the target array.

15. The method of any one of claim 9, comprising configuring the second pair of acousto-optic deflectors for deflecting the second light beam for generating the mobile optical tweezers for re-arranging particles in the particle array on the substrate based on an image taken by the sensor of the particle array on the substrate representative of an occupancy matrix of the particle array.

16. The method of claim 15, comprising configuring the second pair of acousto-optic deflectors for deflecting the second light beam for generating the mobile optical tweezers for re-arranging particles in the particle array on the substrate in a sequence of re-arrangement cycles, based on respective images taken by the sensor of the particle array on the substrate representative of the occupancy matrix of the particle array prior to each re-arrangement cycle.

17. A method of arranging a particle array comprising the steps of:

generating static optical tweezers for the particle array such that a target array and a reservoir array are generated on a substrate, wherein the reservoir array surrounds the target array;

generating multiple mobile optical tweezers simultaneously based on an image of the particle array on the substrate representative of an occupancy matrix of the particle array; and using the mobile optical tweezers for re-arranging particles in the particle array;

wherein re-arranging the particles comprises a row sorting step for arranging particle rows of the target array; and a column compression step for arranging particle columns of the target array;

wherein the row sorting step comprises prioritizing rows that are closest to, or equal to, half-filled.

18. The method of claim 17, wherein a maximum number of mobile optical tweezers for re-arranging the particles is variable to vary a degree of parallelism.

19. The method of claim 17, wherein the reservoir array completely surrounds the target array.

20. The method of any one of claim 17, comprising generating the mobile optical tweezers for re-arranging particles in the particle array on the substrate in a sequence of re-arrangement cycles, based on respective images taken of the particle array on the substrate representative of the occupancy matrix of the particle array prior to each re-arrangement cycle.

* * * * *